(12) United States Patent
Zaugg et al.

(10) Patent No.: US 9,690,256 B2
(45) Date of Patent: Jun. 27, 2017

(54) MAGNETIC DEVICE FOR PIVOTING AN ARBOR IN A TIMEPIECE MOVEMENT

(71) Applicant: Montres Breguet S.A., L'Abbaye (CH)

(72) Inventors: Alain Zaugg, Le Sentier (CH); Benoit Legeret, Le Sentier (CH); Sylvain Marechal, Bois-d'Amont (FR); Davide Sarchi, Renens (CH)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 15/176,268

(22) Filed: Jun. 8, 2016

(65) Prior Publication Data
US 2016/0370762 A1    Dec. 22, 2016

(30) Foreign Application Priority Data
Jun. 16, 2015    (EP) .................................... 15172406

(51) Int. Cl.
   *G04B 31/02*    (2006.01)
   *G04B 1/08*    (2006.01)
   *F16C 32/04*    (2006.01)

(52) U.S. Cl.
   CPC ............ *G04B 1/08* (2013.01); *F16C 32/0412* (2013.01); *G04B 31/02* (2013.01)

(58) Field of Classification Search
   CPC .. G04B 31/00; G04B 31/004; G04B 31/0085; G04B 31/012; G04B 1/08; F16C 32/0406; F16C 32/0408; F16C 32/041; F16C 32/0417; F16C 32/0412
   See application file for complete search history.

(56) References Cited

U.S. PATENT DOCUMENTS

| 4,340,038 | A | | 7/1982 | McKean | |
|---|---|---|---|---|---|
| 5,831,362 | A | * | 11/1998 | Chu | .................... F16C 32/0438 310/90 |
| 8,579,501 | B2 | * | 11/2013 | Marechal | ............... G04B 31/00 310/90.5 |

(Continued)

FOREIGN PATENT DOCUMENTS

| EP | 2 887 153 A1 | 6/2015 |
|---|---|---|
| FR | 1 098 890 | 8/1955 |
| WO | WO 2012/062524 A1 | 5/2012 |

OTHER PUBLICATIONS

European Search Report issued Dec. 16, 2015 in European Application 15172406, filed on Jun. 16, 2015 ( with English translation).

*Primary Examiner* — Sean Kayes
(74) *Attorney, Agent, or Firm* — Oblon, McClelland, Maier & Neustadt, L.L.P.

(57) ABSTRACT

The device for pivoting an arbor about a determined axis includes at least one magnetic bearing including a magnet which exerts a force of attraction on a pivot, made of magnetic material, of the arbor. Further, the bearing includes a magnetic flux centring structure arranged between the magnet and the pivot, and a support for the centring structure. This centring structure includes a peripheral portion and a central portion resiliently connected to the peripheral portion by at least one connecting element, the central portion being formed of a highly magnetically permeable material and having smaller dimensions than those of the magnet. The peripheral portion is rigidly force fitted to the support so that the central portion is centred on the pivot axis.

8 Claims, 4 Drawing Sheets

(56) References Cited

U.S. PATENT DOCUMENTS

| | | | | |
|---|---|---|---|---|
| 8,702,301 | B2* | 4/2014 | Hiraoka | G04B 17/06 368/324 |
| 8,760,021 | B2* | 6/2014 | Post | F16C 41/001 29/898 |
| 9,030,070 | B2* | 5/2015 | Marechal | F16C 32/0408 310/90.5 |
| 2006/0215499 | A1* | 9/2006 | Kohler | G04B 31/04 368/324 |
| 2011/0080810 | A1* | 4/2011 | Hiraoka | G04B 17/06 368/131 |
| 2011/0291506 | A1* | 12/2011 | Post | F16C 32/0408 310/90.5 |
| 2012/0112589 | A1 | 5/2012 | Marechal et al. | |
| 2012/0113767 | A1* | 5/2012 | Marechal | G04B 31/02 368/287 |
| 2015/0177695 | A1 | 6/2015 | Tadla et al. | |
| 2015/0198926 | A1* | 7/2015 | Girardin | G04B 31/04 368/326 |
| 2015/0234361 | A1 | 8/2015 | Marechal et al. | |
| 2015/0362892 | A1* | 12/2015 | Zaugg | G04C 3/064 368/168 |

* cited by examiner

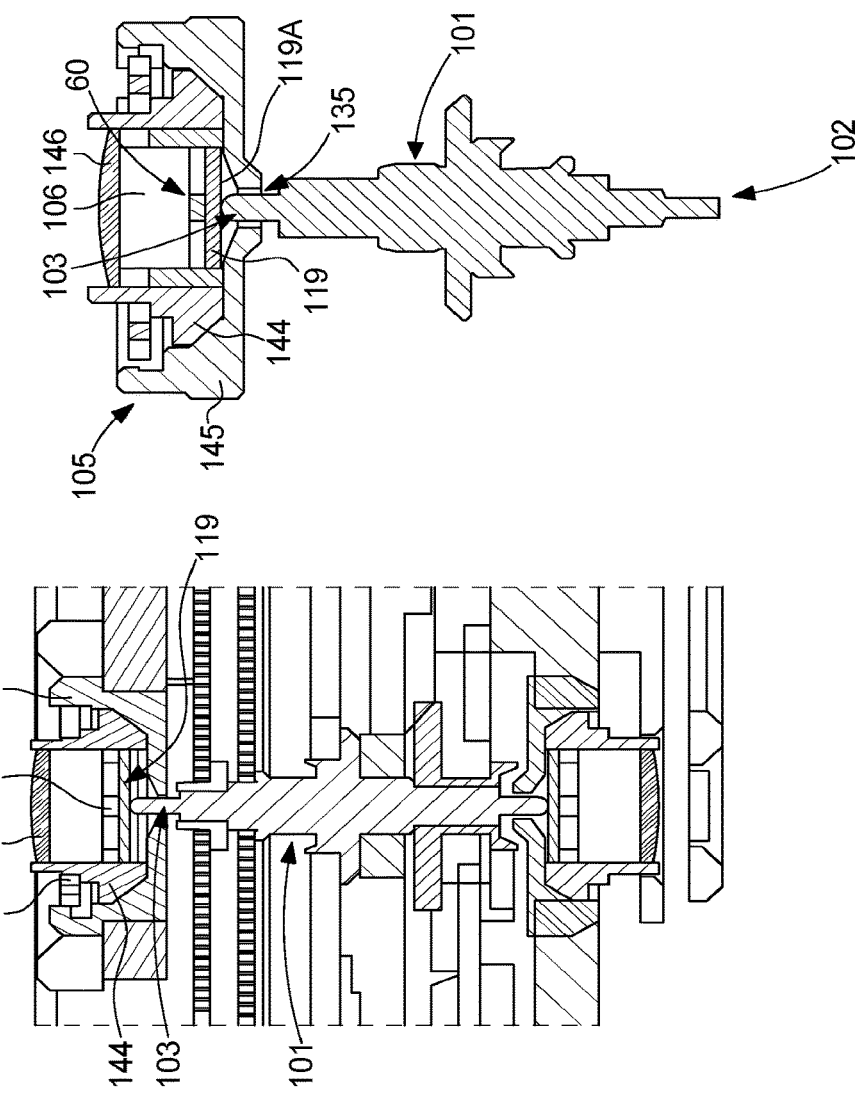

MAGNETIC DEVICE FOR PIVOTING AN ARBOR IN A TIMEPIECE MOVEMENT

This application claims priority from European Patent Application No. 15172406.9 filed Jun. 16, 2015, the entire disclosure of which is incorporated herein by reference.

FIELD OF THE INVENTION

The present invention concerns a timepiece assembly comprising an arbor of a rotating member and a device for pivoting the arbor about a determined axis inside a timepiece movement, the pivoting device comprising at least one magnetic bearing equipped with a magnet arranged to exert an attractive force on a pivot, made of magnetic material, of the arbor.

PRIOR ART

The use of permanent magnets in rotating members of timepiece movements is potentially advantageous, especially because it enables significant localised forces to be created while limiting friction.

There are known pivoting devices with magnets which meet the definition given in the preamble. The device for pivoting an arbor in a timepiece which is shown in FIG. 13 of WO Patent application n° 2012/062524 is one example. FIG. 1 annexed hereto is a reproduction of this prior art illustration. The pivoting device shown is provided for an arbor 1 whose ends form two pivots, respectively referenced 2 and 3. The pivots are made of a magnetic material. The Figure also shows a first bearing and a second bearing arranged to support and guide in rotation the two pivots 2 and 3. Each of the two bearings includes a setting, respectively referenced 40 and 44, a permanent magnet, respectively referenced 4 and 6, mounted in the setting, and a jewel with a bearing surface, respectively referenced 18A and 19A, inserted between the magnet and the opening of the setting. Magnets 4 and 6 of the first bearing and of the second bearing are oriented so as to attract respectively the first and the second pivot, so that arbor 1 is maintained in the pivot axis, with some radial and axial play.

Producing reliable timepiece mechanisms that operate in accordance with the principles described above represents a significant technical challenge, because of the extremely reduced dimensions and high spatial precision required to perform chronometric functions with precision.

Indeed, most natural or synthetic magnetic materials are inhomogeneous on the scale of a millimetre of less. The positioning and intensity of magnetic fields on this scale is thus difficult to control. In particular, permanent micro-magnets which have the highest magnetic energy intensity, for example SmCo or NdFeB micro-magnets, are typically manufactured from powders of chemical elements from the rare earth family, as their granular structure has dimensions comprised between 1 and 100 microns. The homogeneity of the magnetic field generally decreases as it approaches the grain scale.

BRIEF SUMMARY OF THE INVENTION

It is an object of the present invention to overcome the drawbacks of the prior art by providing a pivoting device wherein the spatial distribution of the magnetic field generated by the magnet is determined with greater precision. The present invention achieves this object by providing a pivoting device conforming to the annexed claim 1.

It will be understood that, according to the invention, the presence of the magnetic flux centring structure between the magnet and the pivot has the effect, on the one hand, of increasing the magnetic field intensity in the central portion, and on the other hand, of increasing the radial gradient of the magnetic field. A first advantage of the invention is thus to increase the magnetic return force which acts radially on the pivot.

According to the invention, in cross-section with respect to the pivot axis, the central portion has smaller dimensions than those of the magnet. Further, since the central portion concentrates the magnetic field, the pivot is attracted in the direction of the centre of the central portion. A second advantage of the invention is thus that the pivot is centred with improved precision regardless of any magnetic defects in the magnet.

According to the invention, the peripheral portion is rigidly assembled to the support so that the central portion is centred on the determined pivot axis. A third advantage of the invention is thus that the magnetic flux centring structure is centred by design and channels the magnetic flux from the magnet centrically on the pivot axis provided, regardless of any geometrical defects in the magnet.

According to the invention, the central portion of the centring structure is resiliently maintained in place by the peripheral portion to which it is connected. Indeed, the central portion is resiliently connected to the peripheral portion by at least one connecting element and this peripheral portion is forcibly inserted into a housing in the support, the central portion being connected to the support via the peripheral portion. Thus, even if the peripheral portion is deformed when it is force fitted to the support, the central portion substantially retains its central position relative to the peripheral portion of the centring structure. A fourth advantage of the invention is thus the "self-centring" of the central portion when the centring structure is assembled to its support.

It is specified that "resiliently or elastically connected" means that the connecting element(s) between the central portion and the peripheral portion is/are elastic and that the deformation that it/they undergo during the force fit of the peripheral portion to the support is an essentially elastic deformation. The adjective "elastic" or "resilient" means: "having the quality of at least partially resuming its initial shape or volume after being deformed". When a resilient or elastic object is deformed, the deformation produces restoring forces which resist the deformation and whose intensity is an increasing function of the amplitude of deformation.

BRIEF DESCRIPTION OF THE DRAWINGS

Other features and advantages of the invention will appear upon reading the following description, given solely by way of non-limiting example, with reference to the annexed drawings, in which:

FIGS. 2 and 4 are partial, respectively perspective and longitudinal cross-sectional views of an anti-shock pivoting device corresponding to a first exemplary embodiment of the invention.

FIG. 3 is a partial cross-sectional view of a watch movement, which shows an example of how the pivoting device of FIGS. 2 and 4 can be incorporated in a timepiece movement.

DETAILED DESCRIPTION OF EMBODIMENTS

Figure 5:
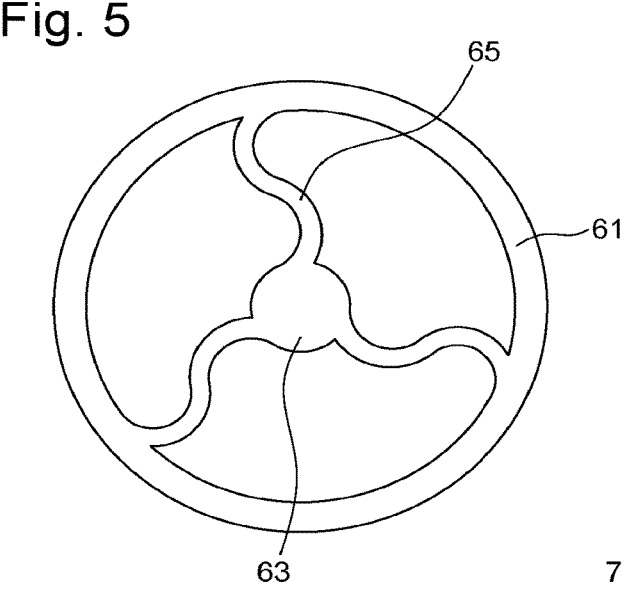
FIGS. 5, 6 and 7 are schematic plan views which illustrate three variants of magnetic flux centring structures suitable for use, for example, in the pivoting device of FIGS. 2, 3 and 4.
Figure 6:
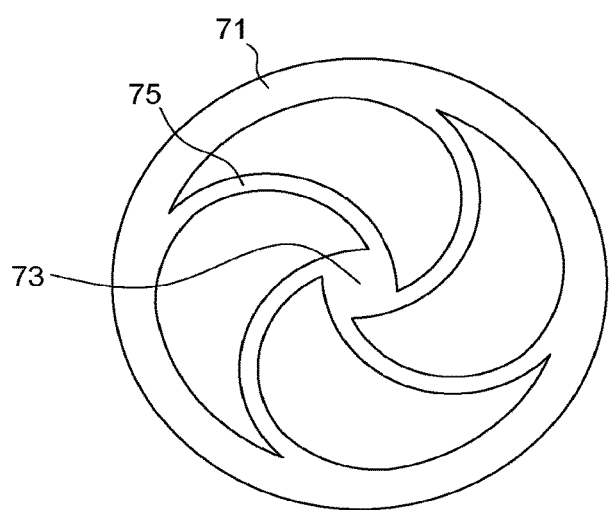
Figure 7:
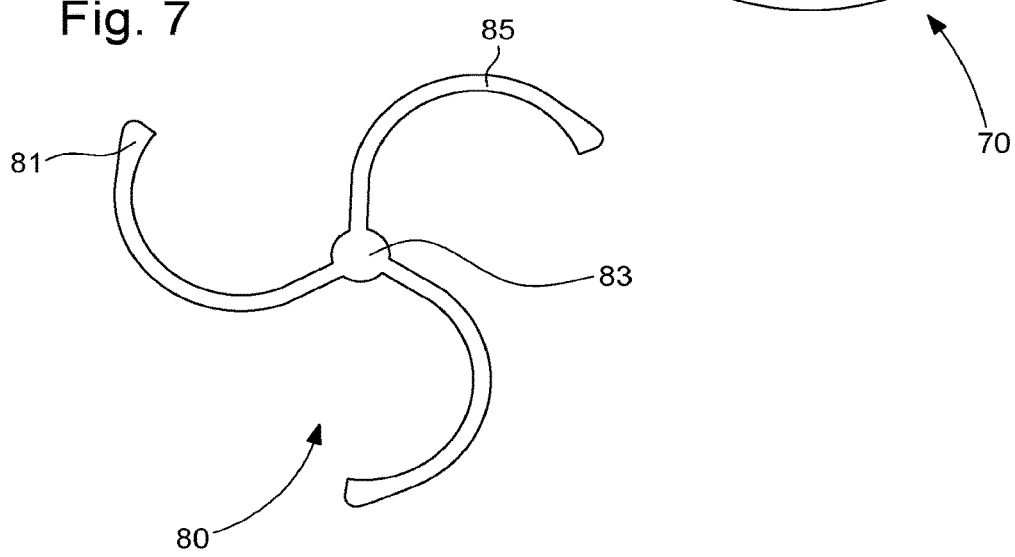

FIGS. 5, 6 and 7 are schematic plan views which illustrate three variants of the magnetic flux centring structure for a pivoting device according to a particular embodiment of the invention.

According to the invention, the centring structure includes a peripheral portion (respectively referenced 61, 71, 81 in FIGS. 5, 6 and 7) and a central portion (respectively referenced 63, 73, 83) resiliently connected to the peripheral portion by at least one connecting element (respectively referenced 65, 75, 85). Also according to the invention, the central portion is formed of a highly magnetically permeable material. The other parts of the magnetic flux centring device may be formed of the same material as the central portion. However, it is also possible to make the connecting element and the peripheral portion from another material, for example a material which preferably has low magnetic permeability, in particular a non-magnetic material. A non-magnetic material means a material having low magnetic permeability with a value close to 1. The magnetic flux centring structure may, for example, be made by the LIGA technique.

According to a variant of the invention that is not illustrated, the connecting element resiliently connecting the peripheral portion to the central portion may take the form of a thin sheet (possibly a corrugated thin sheet) which extends from the central portion to the peripheral portion, preferably over 360°, all around the central portion, so as to close the space between the peripheral portion and the central portion. In the case where the thin sheet forming the connecting element is made of the same material as the central portion, its thickness is preferably equal to or less than one tenth of the thickness of the central portion, so as to avoid closing the magnetic field lines around the magnet through the thin sheet, and therefore to minimise any shielding effect. It will also be understood that the sheet forming the connecting element could also be pierced with holes.

Referring again to FIGS. 5, 6 and 7, it can be seen that the magnetic flux centring structures which are illustrated each include at least resilient connecting elements. The peripheral portion 61 of the magnetic flux centring structure 60 shown in FIG. 5 takes the form of a circular ring. It will be understood, however, that the peripheral portion could alternatively be oval, elliptical, polygonal, etc. In the example illustrated in FIG. 5, central portion 63 is in the form of a disc whose diameter is equal to around 12% of the diameter of the peripheral portion. The central portion and the peripheral portion are connected by three S-shaped connecting elements 65. As shown in FIG. 5, the three connecting elements are arranged radially around the central portion and angularly spaced at approximately 120° from each other. Further, the connecting elements extend over a length which is equal to approximately 40% of the diameter of the centring structure. More generally, the span of the connecting elements is preferably comprised between 20% and 45% of the diameter of the centring structure. It will also be understood that the "S" shape of connecting elements 65 has the effect of increasing their elasticity.

Referring more specifically now to FIG. 6, it can be seen that the centring structure illustrated includes a peripheral portion 71 and a central portion 73 connected to each other by four connecting elements 75. As can be seen, the connecting elements illustrated are in the form of small bars bent in an arc of a circle. It will be understood that the arc of a circle curvature exhibited by the small bars in the illustrated variant, has the effect of increasing the elasticity of the connection between the central portion and the peripheral portion. In FIG. 6, the four resilient connecting elements are each angularly offset at an angle of 90° relative to each of the two adjacent elements.

The magnetic flux centring structure variant shown in FIG. 7 differs from the two preceding variants in particular in that the peripheral portion 81 does not form a closed frame. As seen in this Figure, in the illustrated variant, the peripheral portion is formed by the three distal ends of the connecting elements 85 shaped in the arc of a circle. The peripheral portion is therefore discontinuous. In the illustrated example, it is limited to three tabs regularly distributed around the disc forming central portion 83.

In the three variants of FIGS. 5 to 7, according to a preferred embodiment, the resilient connecting elements are regularly arranged around the central portion. More specifically, in these variants, the resilient connecting elements all have a similar shape and are angularly arranged relative to the central portion with a substantially constant angular offset between any two adjacent connecting elements. It will be noted that a "similar shape" also includes a shape resulting from an axially or centrally symmetric transformation of a given shape, for example an inversion of the "S" shape with a vertical axis of symmetry. This preferred embodiment enables a given central position of the central portion to be maintained, relative to the support for the magnetic flux centring structure, when the structure is force fitted in its support, regardless of any stresses exerted on the peripheral portion during this force fit which may cause some deformation of the peripheral portion, especially a diminution of its external dimensions.

The highly magnetically permeable material, of which the central portion of the magnetic flux centring structure of the invention is made, may advantageously be nickel or cobalt or a nickel or cobalt based alloy. In one embodiment, the material may be nickel-phosphorus with a percentage of phosphorus less than or equal to 11%. According to another variant, the magnetic flux centring element may be entirely made of a magnetically soft material, characterized by a coercive field $H_c$ of less than 5 kA/m, with a higher saturation than 0.5 T and a maximum permeability $\mu_R$ equal to or greater than 1000. According to another variant, the material may be magnetically hard.

FIGS. 2, 3 and 4 illustrate an anti-shock pivoting device which corresponds to a first specific embodiment of the invention. It will be understood that the magnetic flux centring structures 60, 70 and 80 which were described in relation to FIGS. 5, 6 and 7 are adapted in particular for use in the pivoting device which will now be described.

FIGS. 2, 3 and 4 show a support 145, whose base includes an opening 135 for the passage of the pivot 103. The support is arranged for positioning a setting 144. To this end, the setting is retained inside an inverted cone-shaped housing in support 145 by resilient means, which, in the present example, are formed by a spring 110. In the illustrated example, support 145 is a part of revolution comprising a circular rim. The pivoting device is provided for an arbor 101 whose ends 102, 103 respectively form first and second pivots. Pivot 103 is made of a magnetic material. Moreover, setting 144 and support 145 form part of a bearing 105, which is arranged to support and guide in rotation pivot 103. As shown in FIG. 3, the pivoting device of the present example also includes a second bearing (not referenced) which is arranged to support and guide in rotation pivot 102 (which is not shown in FIGS. 2 and 4).

It can also be seen that setting 144 contains a closing jewel 146, a permanent magnet 106, a magnetic flux centring structure 60 and a tribological jewel 119, which has a bearing surface 119A for pivot 103. The bearing surface forms a stop member for the pivot. The jewel 146 is arranged to close the top of the setting and thus to form a closed housing for the magnet. The tribological jewel is inserted between the magnet and the opening of the setting and the magnetic flux centring structure is sandwiched between the magnet and the tribological jewel. It will be understood that magnet 106 and centring structure 60 are arranged to attract pivot 103, so that arbor 101 is maintained in a determined radial position and also, with play, in a given axial position.

In the event of an axial shock, pivot 103 of balance staff 101 pushes tribological jewel 119 and setting 144 upwards. In such case, it is only spring 110 that acts to return the setting and the balance staff to their initial position. Spring 110 is dimensioned to have a limited displacement so that beyond its limit, a shoulder of staff 101 abuts against the outer edge of opening 135 so as to allow a thicker portion of the staff to absorb the shock. In the event of a lateral shock of moderate intensity, it is only the magnetic field produced by magnet 106 that acts to return the pivot to its position of equilibrium. It will be understood that the position of equilibrium of the pivot corresponds to the maximum magnetic field intensity and that the location of this maximum intensity coincides with the position of central portion 63 of centring structure 60. If the intensity of the lateral shock exceeds a certain limit, the force produced by the magnetic field is not sufficient to retain pivot 103. The pivot then abuts against the outer edge of opening 135. Next, once the travel of the pivot has been stopped by the outer edge of the opening, the magnetic force can return the pivot towards its position of equilibrium.

Figure 1:
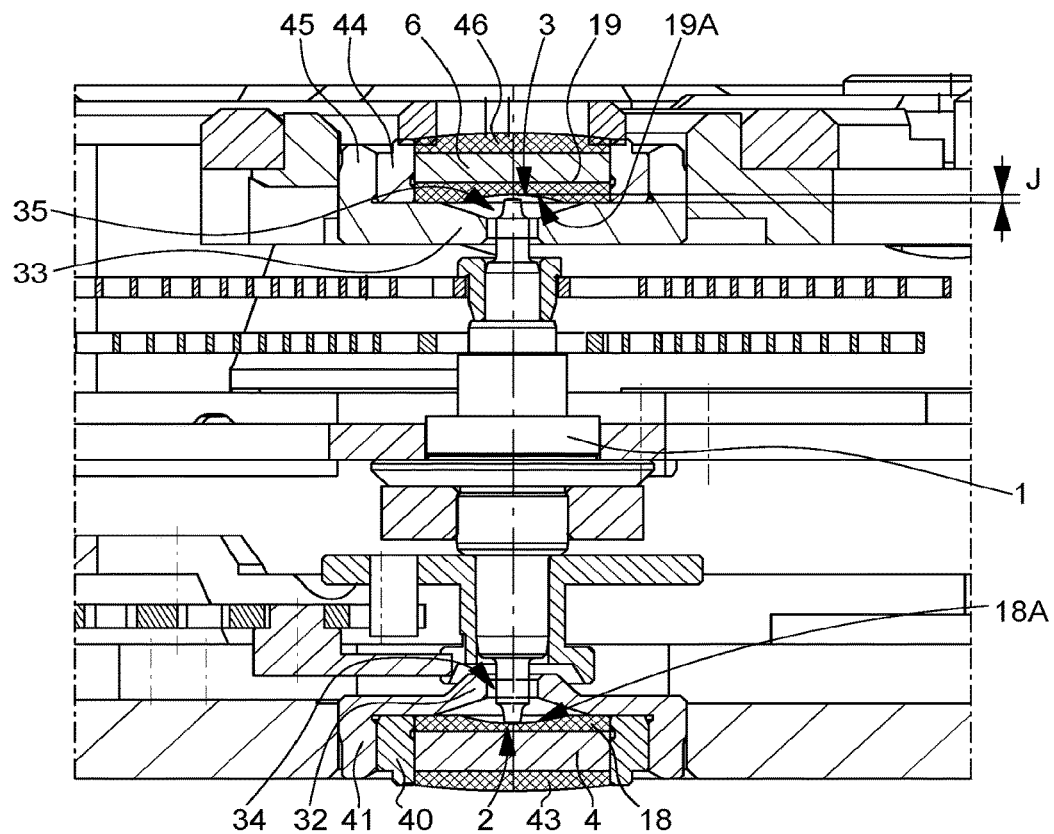
FIG. 1 is a longitudinal cross-sectional view of a magnetic pivoting device of the prior art.

According to a variant, instead of being flat, bearing surface 119A of tribological jewel 119 could contain a hollow, like bearing surface 19A of jewel 19 of FIG. 1. It will be understood that, in such case, it would not simply be the force of the magnet acting to return the pivot to its position of equilibrium following a shock, but the retaining force of the pivot against the hollow would also contribute to returning the pivot to its position of equilibrium (the axial force induces, via the reaction force of the hollow, a radial component).

In the variants of FIGS. 2, 3 and 4, the magnetic flux centring structure and the magnet have substantially the same diameter. This diameter is preferably comprised between 0.4 and 1.5 mm. According to the invention, in cross-section to the pivot axis, central portion 63 of centring structure 60 has smaller dimensions than those of the magnet. In these conditions, the diameter of the central portion is preferably comprised between 0.1 and 1 mm. Moreover, the thickness of this central portion is preferably comprised between 40 and 100 µm.

According to the invention, the pivoting device includes a support for the centring structure. The peripheral portion 61 of the centring structure is rigidly assembled to the support, the peripheral portion being forcibly inserted in a housing in the support. It will be understood that, according to the embodiment of the present example, the support in question is formed by setting 144. The peripheral portion is thus driven into the setting.

Experience shows that doing this can cause a relatively significant deformation of peripheral portion 61. In these conditions, if central portion 63 were not resiliently connected to the peripheral portion, the position occupied by the central portion after the drive fit would be impossible to predict. One advantage of the resilient connection of the invention is that the position of the central portion after the drive fit corresponds to a resilient position of equilibrium which, by design, remains close to the centre of the setting. This therefore ensures that the central portion is centred on the pivot axis which passes through the centre of the setting.

Figure 8A:
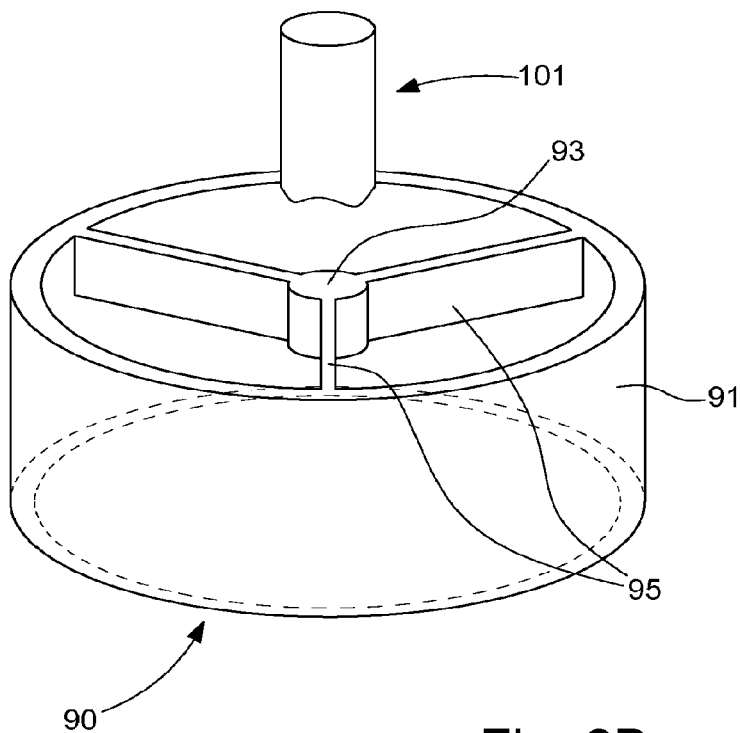
FIG. 8A is a perspective view of a magnetic flux centring device suitable for use, for example, in a pivoting device of FIG. 8B.
Figure 8B:
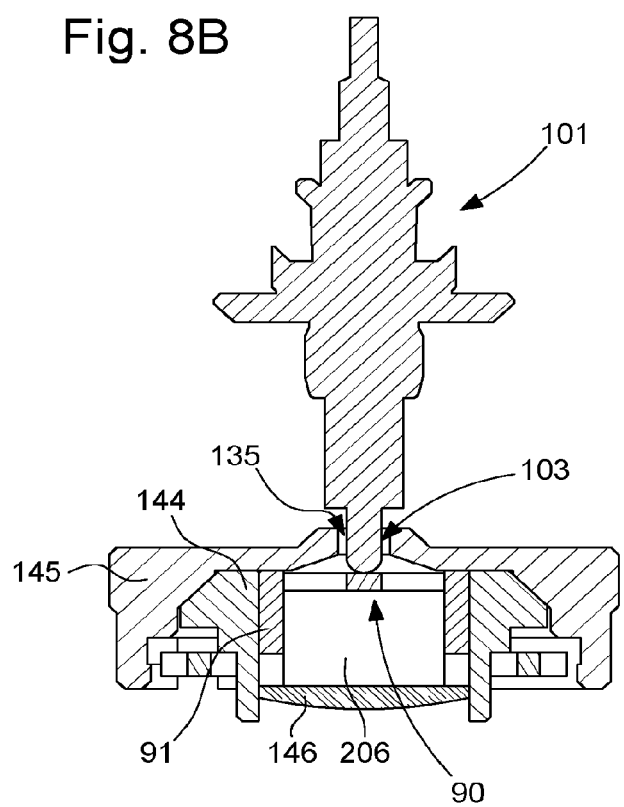
FIG. 8B is a partial longitudinal cross-sectional view, similar to that of FIG. 4, but illustrating a pivoting device corresponding to a second exemplary embodiment of the invention.

FIGS. 8A and 8B correspond to a second specific embodiment of the invention. FIG. 8B is a partial longitudinal cross-section of this second embodiment of the pivoting device of the invention. FIG. 8A is a schematic perspective view showing only the magnetic flux centring structure and a portion of arbor 101. It will be understood, in particular, that pivot 103, which is located at the end of the arbor is not shown in this partial view, to avoid overloading the drawing. Referring again to FIG. 8A, it can be seen that the centring structure 90 illustrated includes three connecting elements 95 in the form of small bars which are oriented radially (in a similar manner to the case shown in FIG. 5). Centring structure 90 includes a central portion 93 in the form of a small solid cylinder, and a peripheral tube-shaped portion 91. In the illustrated example, this is a tube of circular section. It will be understood, however, that it could alternatively be a tube of oval, elliptic, polygonal section etc. Moreover, as shown in FIG. 8A, and unlike the case of the first embodiment, peripheral portion 91 is much higher than central portion 93. The central portion is situated at one end of tube 91. It will therefore be understood that, in the illustrated embodiment, the peripheral portion delimits a cavity underneath the central portion. As shown in FIG. 8B, this cavity is adapted to contain a magnet.

FIG. 8B is very similar to FIG. 4. This is why the same reference numbers have been attributed to any elements of FIG. 8B that are virtually identical to elements of FIG. 4. It will be noted, however, that magnet 206 has a smaller diameter than the diameter of magnet 106 of FIG. 4, which makes it possible for magnet 206 to be driven into or adhesive bonded inside peripheral portion 91 of magnetic flux centring structure 90. The pivoting device illustrated in FIG. 8B will not be described in detail since it is virtually identical to that of FIG. 4.

Referring again to FIG. 8B, it can also be seen that pivot 103 is in direct contact with central portion 93 of the magnetic flux centring structure which thus defines an endstone. It will thus be understood that, in the variant shown, the central portion of the centring structure also acts as a bearing surface for the pivot. To this end, central portion 93 is made using a magnetic material which also has good tribological properties. Such materials, possessing both good magnetic qualities and good tribological properties, may be obtained, for example, in the form of an alloy combining a hard metal with a cobalt or nickel binder. According to an advantageous variant, the hard metal in question is tungsten carbide (WC). According to a preferred variant, the material forming the endstone is a mixture of tungsten carbide and cobalt including between 20 and 25% of cobalt. Alternatively, the material forming the endstone may be a magnetic metallic glass. Advantageously, the metallic glass is an iron-based metallic glass. It will also be clear that various alterations and/or improvements evident to those skilled in the art may be made to the embodiment forming the subject of the present description without departing from the scope of the present invention defined by the annexed claims.

What is claimed is:

1. A device for pivoting an arbor about a determined pivot axis in a timepiece movement, including at least one magnetic bearing comprising a magnet arranged to exert a force of attraction on a pivot, made of magnetic material, of the arbor, wherein the bearing includes a magnetic flux centring structure, arranged between the magnet and the pivot, and a support for the centring structure, this centring structure including a peripheral portion and a central portion resiliently connected to the peripheral portion by at least one connecting element, the central portion being formed of a highly magnetically permeable material and, in cross-section with respect to the pivot axis, having smaller dimensions than those of the magnet; and wherein the peripheral portion is rigidly assembled to said support so that the central portion is centred on the determined pivot axis, said peripheral portion being forcibly inserted into a housing in the support and the central portion being thus connected to the support via the peripheral portion.

2. The pivoting device according to claim 1, wherein the magnetic flux centring structure includes at least three resilient connecting elements.

3. The pivoting device according to claim 2, wherein at least three resilient connecting elements are regularly arranged around said central portion.

4. The pivoting device according to claim 3, wherein said at least three resilient connecting elements all have a similar shape and are angularly arranged, relative to said central portion, with a substantially constant angular offset between any two adjacent connecting elements.

5. The pivoting device according to claim 1, wherein the device defines an anti-shock pivoting device wherein the bearing is resiliently maintained in place.

6. The pivoting device according to claim 1, wherein a tribological jewel, defining a bearing surface for the pivot, is arranged between the magnetic flux centring device and said pivot, the bearing surface forming a stop member for the pivot.

7. The pivoting device according to claim 1, wherein the bearing includes a setting, the magnet being mounted in the setting and the magnetic flux centring device being inserted between the magnet and the opening of the setting.

8. The pivoting device according to claim 1, wherein the external portion of the centring device forms a tube and said central portion is situated at one end of said tube, said magnet being mounted inside the tube so that the central portion is between said magnet and the pivot.

* * * * *